(12) United States Patent
Smith et al.

(10) Patent No.: US 10,114,761 B2
(45) Date of Patent: Oct. 30, 2018

(54) SHARING TRANSLATION LOOKASIDE BUFFER RESOURCES FOR DIFFERENT TRAFFIC CLASSES

(71) Applicants: Advanced Micro Devices, Inc., Sunnyvale, CA (US); ATI Technologies ULC, Markham (CA)

(72) Inventors: Wade K. Smith, Sunnyvale, CA (US); Kostantinos Danny Christidis, Markham (CA)

(73) Assignees: ATI TECHNOLOGIES ULC., Markham, Ontario (CA); ADVANCED MICRO DEVICES, INC., Santa Clara, CA (US)

( * ) Notice: Subject to any disclaimer, the term of this patent is extended or adjusted under 35 U.S.C. 154(b) by 65 days.

(21) Appl. No.: 15/442,462

(22) Filed: Feb. 24, 2017

(65) Prior Publication Data
US 2018/0246815 A1 Aug. 30, 2018

(51) Int. Cl.
*G06F 12/00* (2006.01)
*G06F 12/1027* (2016.01)
*G06F 12/1081* (2016.01)
*G06F 12/1009* (2016.01)
*G06F 9/38* (2018.01)
(Continued)

(52) U.S. Cl.
CPC ........ *G06F 12/1027* (2013.01); *G06F 9/3887* (2013.01); *G06F 12/1009* (2013.01); *G06F 12/1081* (2013.01); *G06F 2212/681* (2013.01); *G06F 2212/684* (2013.01)

(58) Field of Classification Search
CPC ............ G06F 12/1027; G06F 12/1081; G06F 12/1009; G06F 2212/681
See application file for complete search history.

(56) References Cited

U.S. PATENT DOCUMENTS 7,278,008 B1 * 10/2007 Case ................... G06F 12/1036
710/26
7,281,086 B1 * 10/2007 More ...................... G06F 3/061
710/39
(Continued)

*Primary Examiner* — Mark A Giardino, Jr.
(74) *Attorney, Agent, or Firm* — Volpe and Koenig, P.C.

(57) ABSTRACT

Techniques are provided for managing address translation request traffic where memory access requests can be made with differing quality-of-service levels, which specify latency and/or bandwidth requirements. The techniques involve translation lookaside buffers. Within the translation lookaside buffers, certain resources are reserved for specific quality-of-service levels. More specifically, translation lookaside buffer slots, which store the actual translations, as well as finite state machines in a work queue, are reserved for specific quality-of-service levels. The translation lookaside buffer receives multiple requests for address translation. The translation lookaside buffer selects requests having the highest quality-of-service level for which an available finite state machine is available. The fact that finite state machines are reserved to particular quality-of-service levels means that if all such finite state machines for a particular quality-of-service level are used by pending translation requests, then the translation lookaside buffer does not accept more translation requests for that quality-of-service level.

20 Claims, 5 Drawing Sheets

(51) Int. Cl.
   *G06F 13/00*   (2006.01)
   *G06F 13/28*   (2006.01)

(56) References Cited

U.S. PATENT DOCUMENTS

| | | | | |
|---|---|---|---|---|
| 2003/0177313 | A1* | 9/2003 | Iyer | G06F 12/0848 711/129 |
| 2003/0227926 | A1* | 12/2003 | Ramamurthy | H04L 12/5601 370/395.42 |
| 2005/0114605 | A1* | 5/2005 | Iyer | G06F 12/0888 711/133 |
| 2008/0235487 | A1* | 9/2008 | Illikkal | G06F 12/126 711/207 |
| 2010/0306499 | A1* | 12/2010 | Petolino, Jr. | G06F 12/1027 711/207 |

* cited by examiner

SHARING TRANSLATION LOOKASIDE BUFFER RESOURCES FOR DIFFERENT TRAFFIC CLASSES

TECHNICAL FIELD

The disclosed embodiments are generally directed to virtual memory address translations, and, in particular, to sharing translation lookaside buffer resources for different traffic classes.

BACKGROUND

Virtual memory addressing is a mechanism by which a system obscures the physical addresses of memory locations for the purposes of security and ease of memory management. For example, the operating system controls virtual address mapping such that an application accesses data via virtual addresses and cannot access data for other applications or the operating system. In another example, the operating system can move data between physical addresses, while maintaining the same virtual addresses for that data, thereby hiding memory management operations from the applications.

Virtual memory addressing requires an address translation step. More specifically, to access memory via virtual addresses, the virtual addresses are first translated to physical addresses and memory is accessed based on the physical addresses. Address translations are stored in page tables, which can be quite large. To reduce the latency associated with fetching address translations, address translation caches referred to as translation lookaside buffers are provided.

BRIEF DESCRIPTION OF THE DRAWINGS

A more detailed understanding may be had from the following description, given by way of example in conjunction with the accompanying drawings wherein.

DETAILED DESCRIPTION

Techniques are provided for managing address translation request traffic where memory access requests can be made with differing quality-of-service requirements. Quality-of-service requirements (or "levels") specify latency and/or bandwidth requirements that are to be met for particular memory access requests. For instance, a high quality-of-service level has greater bandwidth requirements and/or lower latency requirements than a low quality-of-service level.

The techniques involve translation lookaside buffers, which act as caches for obtaining virtual-to-physical address translations. Within the translation lookaside buffers, certain resources are reserved for specific quality-of-service levels. More specifically, translation lookaside buffer slots, which store the actual translations, as well as finite state machines in a work queue, are reserved for specific quality-of-service levels. The finite state machines manage individual translations, tracking their state through processing of the translations.

A translation lookaside buffer receives multiple requests for address translation. The translation lookaside buffer selects requests having the highest quality-of-service level for which an available finite state machine is available. The fact that finite state machines are reserved to particular quality-of-service levels means that if all such finite state machines for a particular quality-of-service level are used by pending translation requests, then the translation lookaside buffer does not accept more translation requests for that quality-of-service level until another finite state machine reserved for that quality-of-service level becomes available.

The reservation of translation lookaside buffer resources in this manner allows for a single translation lookaside buffer to service memory address translation requests of different quality-of-service levels without having translation requests of lower quality-of-service levels cause delays for translation requests of higher quality-of-service levels. In one example, without the reservation technique, it would be possible for finite state machines of a translation lookaside buffer to be occupied completely by requests of lower quality-of-service level translation requests, preventing translation requests of higher quality-of-service levels from being serviced by the translation lookaside buffer until after the lower quality-of-service level translation requests have been serviced. In this situation, the higher quality-of-service level requests are degraded in performance by the fact that the lower quality-of-service level requests are being processed and are thus reserving the resources of the translation lookaside buffer. The reservation technique helps prevent this degradation of performance from happening.

Figure 1:
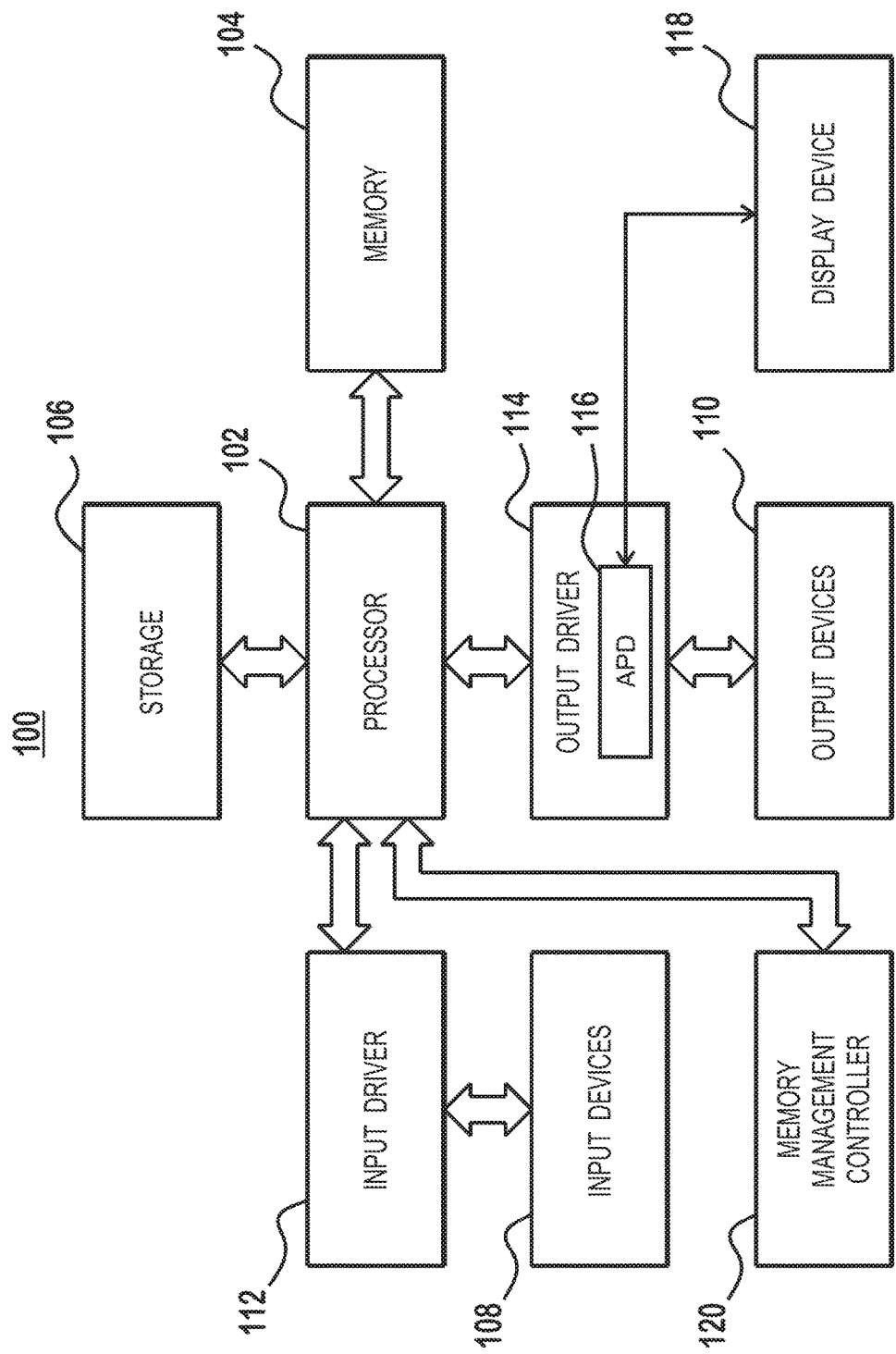
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

A memory management system 120, coupled to the processor 102 and to other units, assists with accessing memory. More specifically, in response to receiving memory access requests, the memory management system 120 performs virtual-to-physical address translations and accesses memory based on the translated physical addresses.

Figure 2:
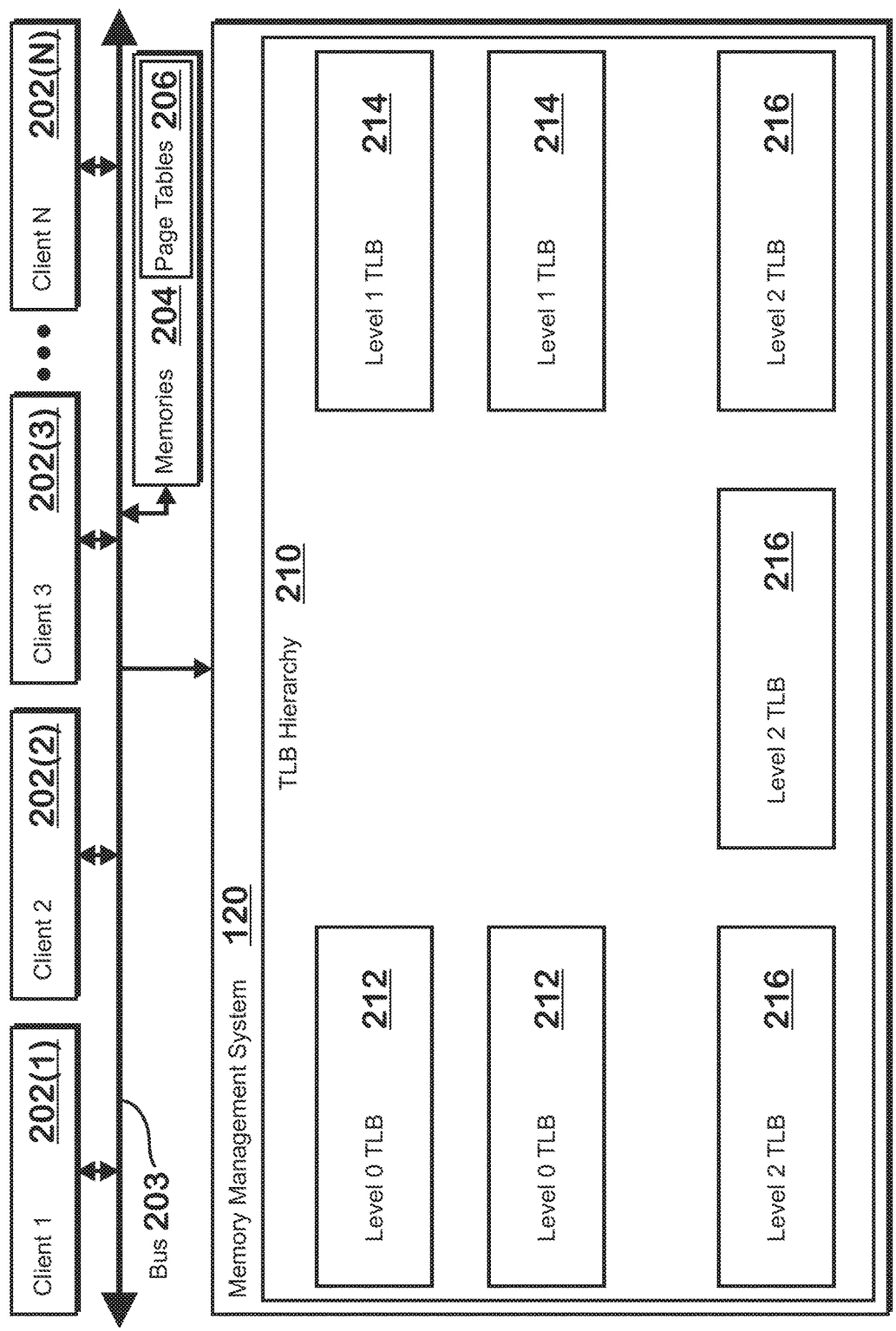
FIG. 2 illustrates details of the memory management system of FIG. 1, according to an example.

FIG. 2 illustrates some details of the memory management system 120 of FIG. 1, according to an example. Several clients 202 are illustrated. The clients 202 represent units of the device 100, or units attached to the device 100, that access memories 204 to process data for various purposes. Examples of clients 202 include graphics processing units ("GPUs"), video encoders, video decoders, camera controllers that read camera sensor data and write that sensor data to memories 204, embedded general purpose microcontrollers, interrupt controllers, general purpose direct memory access ("DMA") engines, or any other unit that reads or writes data in memories. The memories 204 include one or more memory units that store data for processing by the clients 202 and possibly by other units. Memories 204 include various memory devices included within or associated with the device 100, such as system memory 104.

Some clients 202 are "high performance" and access large portions of memory in a very short amount of time. In an example, a 60 frame-per-second camera captures high resolution frames of data into a buffer. A camera controller (one of the clients 202) reads the data from the buffer into a portion of memories 204 (such as system memory 104) for processing by, for example, an application being executed by the processor 102.

Part of accessing data involves memory address translation. More specifically, units often access memory via virtual addresses, rather than physical addresses. Virtual addressing is a mechanism by which the operating system obscures the physical memory space for applications and other entities operating in user space. Applications access data using virtual addresses so that the operating system can control and migrate data in physical memory and also to prevent applications from accessing system data or data for other applications.

Memory address translation involves translating the virtual addresses into physical addresses so that data, which is ultimately accessed via physical address, can be read from or written to. Page tables 206, stored in the memories 204, store address translations that associate virtual addresses with physical addresses. Page tables 206 store mappings for various pages in a memory space. Because the number of pages can be very large, page tables 206 are stored in general purpose memory, such as system memory 104, which is characterized by large capacity but high latency as compared with more dedicated memories such as caches.

For this reason, a translation lookaside buffer 210 ("TLB") hierarchy is provided to store memory address translations that are more relevant to current processing tasks than other memory address translations. The TLB hierarchy 210 is a cache hierarchy that caches virtual-to-physical address translations. The TLB hierarchy 210 includes one or more cache hierarchy levels, with the lowest levels having low latency but low capacity and each successively higher level having greater latency but also greater capacity. The TLB hierarchy 210 illustrated includes three TLB hierarchy levels: a level 0 TLB level, which is the lowest and includes one or more level 0 TLBs 212, a level 1 TLB level, which is the next highest level and includes one or more level 1 TLBs 214, and a level 2 TLB level, which is the next highest level and includes one or more level 2 TLBs 216.

When a client 202 or other unit accesses memory, the accesses may be made via virtual addresses. To access memory, these virtual addresses are translated into physical addresses so that data stored in the memories 204 can be requested. In one example, the TLB hierarchy 210 checks the lowest level TLB 212 for a translation, given a particular virtual address. If a hit occurs, then the translation is fetched from the lowest level TLB 212 and used to access data in the memories 204. If a miss occurs, then the lowest level TLB 212 forwards the virtual address to the next lowest level TLB 214 for translation. Responsive to a miss at that TLB level 214, the next TLB level 216 is checked, and so on. If no translation is found in the TLB hierarchy 210, then the memory management system 120 performs a page table walk, searching the page tables 206 for the requested translation. Responsive to a hit at any level of the TLB hierarchy 210, the TLB hierarchy 210 fills the lower levels of the TLB hierarcy 210 with the translation such that future requests for translation have a greater chance of hitting in those lower levels.

Note that although one scheme for TLB operation is described (the scheme in which the TLBs acts as a traditional cache in which hits or misses can occur and misses cause the TLB to fetch translations from higher up in the cache hierarchy), other possible schemes for TLB operation are possible. In one example, the TLB implements a pre-fetching scheme in which memory address translations are pre-fetched into the TLB at the explicit request of a client 202 and are then used to perform address translations for memory accesses made by that client, greatly reducing the chances of cache misses. Other caching schemes are possible as well and the teachings provided herein are not limited to the particular caching schemes explicitly described herein.

Memory accesses are made with different quality-of-service levels. More specifically, some clients 202 request and expect memory accesses to be serviced with lower latency and greater throughput than other clients 202. In one example, three quality-of-service categories exist: hard real-time, soft real-time, and non-real-time. In general, hard real-time clients have lower latency and/or greater bandwidth requirements than soft real-time clients and non-real-time clients and soft real-time clients have lower latency and/or greater bandwidth requirements than non-real-time clients.

Non-real-time clients have no specific latency or bandwidth requests. Examples of non-real-time clients include central processing units ("CPUs"), graphics processing units ("GPUs"), and many types of devices that are typically coupled to the main peripheral bus (such as a peripheral component interconnect express—"PCIe" bus). Although there are no specific latency or bandwidth requirements for such clients, it is possible for non-real-time clients to "break" if memory access requests exhibit extremely high latency. In one example, a CPU will eventually fault if a response is not received for a particular memory request after an extremely long delay.

Hard real-time clients are clients where strict bandwidth requirements and/or latency requirements exist and if such requirements are not met, a user will likely perceive such errors as a "hard failure"—a betrayal of the user's expectation regarding how the system is to perform. Examples of hard real-time clients are audio and display clients where the user will experience pops or screen tearing in the output if the bandwidth and/or latency requirements are not met.

Soft real-time clients are those where a drop in bandwidth and/or an increase in latency will be perceptible to a user but will not cause a "hard failure." Examples of soft real-time clients are video playback clients where the screen may pause for short periods of time or where individual frames may be skipped without being perceptible to a user.

One component of the memory fabric of the device 100 that can affect bandwidth and latency is the TLB hierarchy 210. More specifically, as described above, the TLB hierarchy 210 performs address translations for memory accesses made via virtual memory addresses. If these translations are performed with too great a latency or at too slow of a rate, then latency and/or bandwidth can be affected.

The fact that clients 202 with different quality-of-service requirements exist means that the clients 202 of different quality-of-service categories can compete for different resources in the TLB hierarchy 210. It would therefore be advantageous to reduce the likelihood of the situation where clients 202 of different quality-of-service requirements compete with each other for TLB resources. In one illustrative example, clients of the non-real-time quality-of-service requirement consume too many resources in the TLB hierarchy 210, leaving too few resources for clients 202 of the hard-real-time quality-of-service requirement. In that situation, even though a first client 202 has a greater quality-of-service requirement than a second client 202, fulfilment of translation requests for the first client 202 is delayed by the actions of the second client 202.

Figure 3:
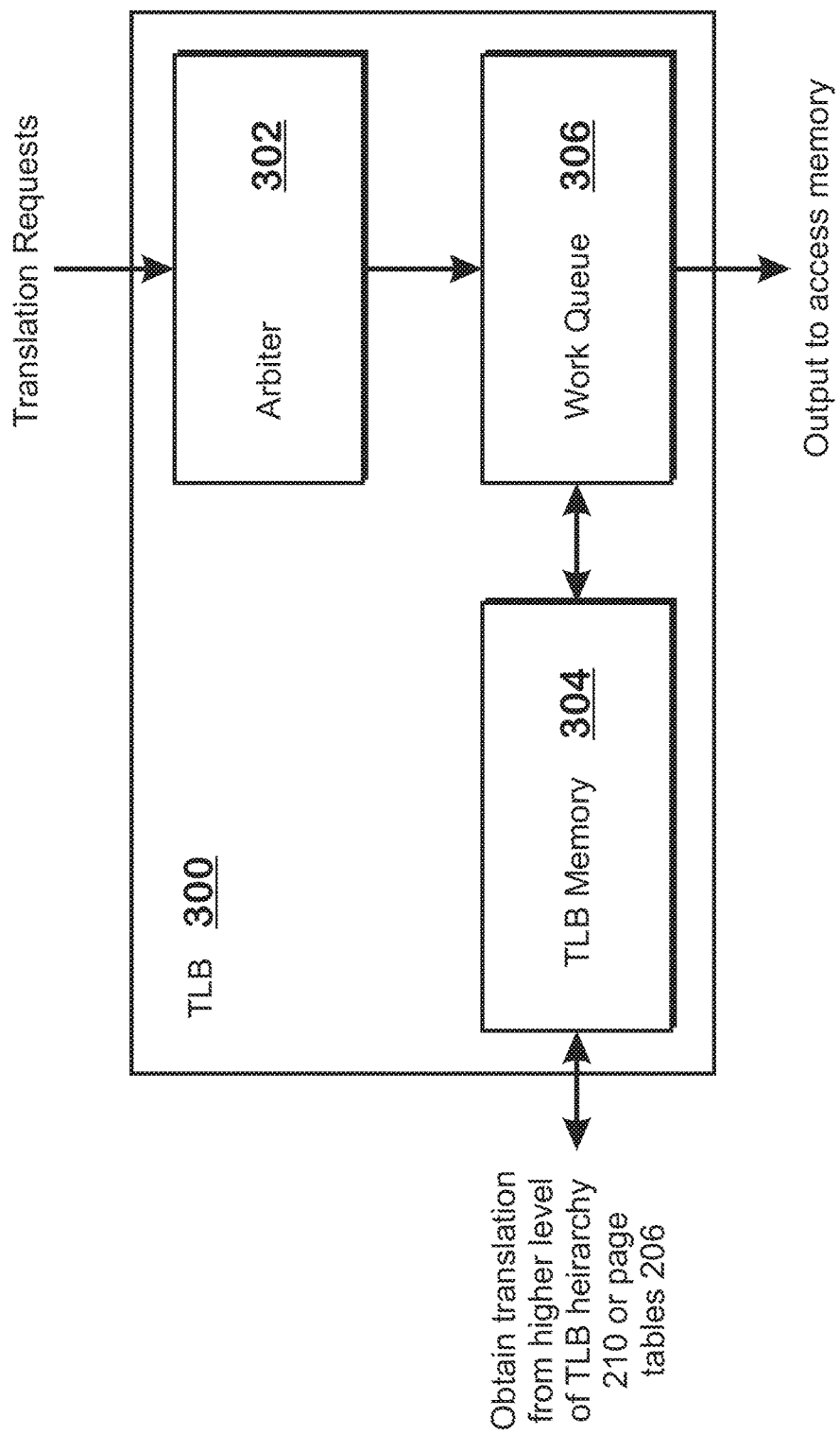
FIG. 3 is a block diagram of a translation lookaside buffer ("TLB"), according to an example.

FIG. 3 is a block diagram of a translation lookaside buffer ("TLB") 300, according to an example. The TLB 300 represents any TLB in the TLB hierarchy 210, such as a level 0 TLB 212, a level 1 TLB 214, or a level 2 TLB 216, or any other TLB that caches virtual-to-physical address translations.

The TLB 300 includes an arbiter 302, a TLB memory 304, and a work queue 306. The TLB memory 304 is the actual memory that stores virtual-to-physical address translations for the TLB 300. The arbiter 302 selects between translation requests of clients 202 with different quality-of-service requirements and transmits selected requests to the work queue 306. More specifically, multiple translation requests may be ready for processing by the TLB 300—the arbiter 302 selects one or more of these waiting requests for processing. The work queue 306 stores translation requests received from the arbiter 302 for processing.

Requests for translation from virtual addresses to physical addresses are generated in response to a client 202 requesting memory access (such as a read or write) to a particular virtual address. Such requests specify the virtual memory address, an access type, and the quality-of-service requirement for that access. These requests for translation arrive at a TLB 300, which performs steps to translate the virtual address in the request.

Multiple requests may be ready to be processed by a particular TLB 300 at a particular time. The arbiter 302 of the TLB 300 selects requests in order from highest quality-of-service level to lowest quality-of-service level (e.g., hard real-time first, then soft real-time, then non-real-time), except that a particular quality-of-service level is skipped in favor of the next-lower quality-of-service level with an available request if there are no resources available for the higher quality-of-service level. More specifically, the work queue 306 dedicates a particular portion of their respective resources to each quality-of-service level. If a request is available to be read in by the arbiter 302 but there are no available resources remaining in the work queue 306 out of the resources that are dedicated to the quality-of-service level specified by that request, then the arbiter 302 selects requests for processing a request having a lower quality-of-service level.

In one example, a request for translation having a hard real-time quality-of-service level and a request for translation having a non-real-time quality-of-service level are available for processing by the arbiter 302 and the resources in the work queue 306 that are dedicated to the hard real-time quality-of-service level are all unavailable due to being used for other in-flight translation requests. In response to determining that there are no available resources in the work queue 306 dedicated to the hard real-time quality-of-service level (but that there are resources available for the non-real-time quality-of-service level), the arbiter 302 selects for processing the request for translation having the non-real-time quality-of-service level.

The resources in the work queue 306 include finite state machines ("FSMs") that store an indication of a request for translation and manage and record the "state" of such requests over their lifespan in the TLB 300. In one example, each FSM manages a single translation. While such translation is being processed in the TLB 300 (and possible outside of the TLB 300, such as at a TLB at a higher level of the TLB hierarchy 210 or is being looked up in the page tables 206), the FSM is reserved for that request and is not available for any other request. When an address translation has been completed and output from the TLB 300, the FSM is again available for use by a different translation. Each FSM is dedicated to a particular quality-of-service level.

The resources in the TLB memory 304 include TLB slots. The TLB slots store virtual-to-physical address translations. As with the FSMs in the work queue 306, the slots in the TLB memory 304 are dedicated to a particular quality-of-service level. When fetched, translations are stored in TLB slots 402 reserved for the quality-of-service level associated with the request for which the translation was fetched and are not put in the slots 402 reserved for other quality-of-service levels.

Figure 4:
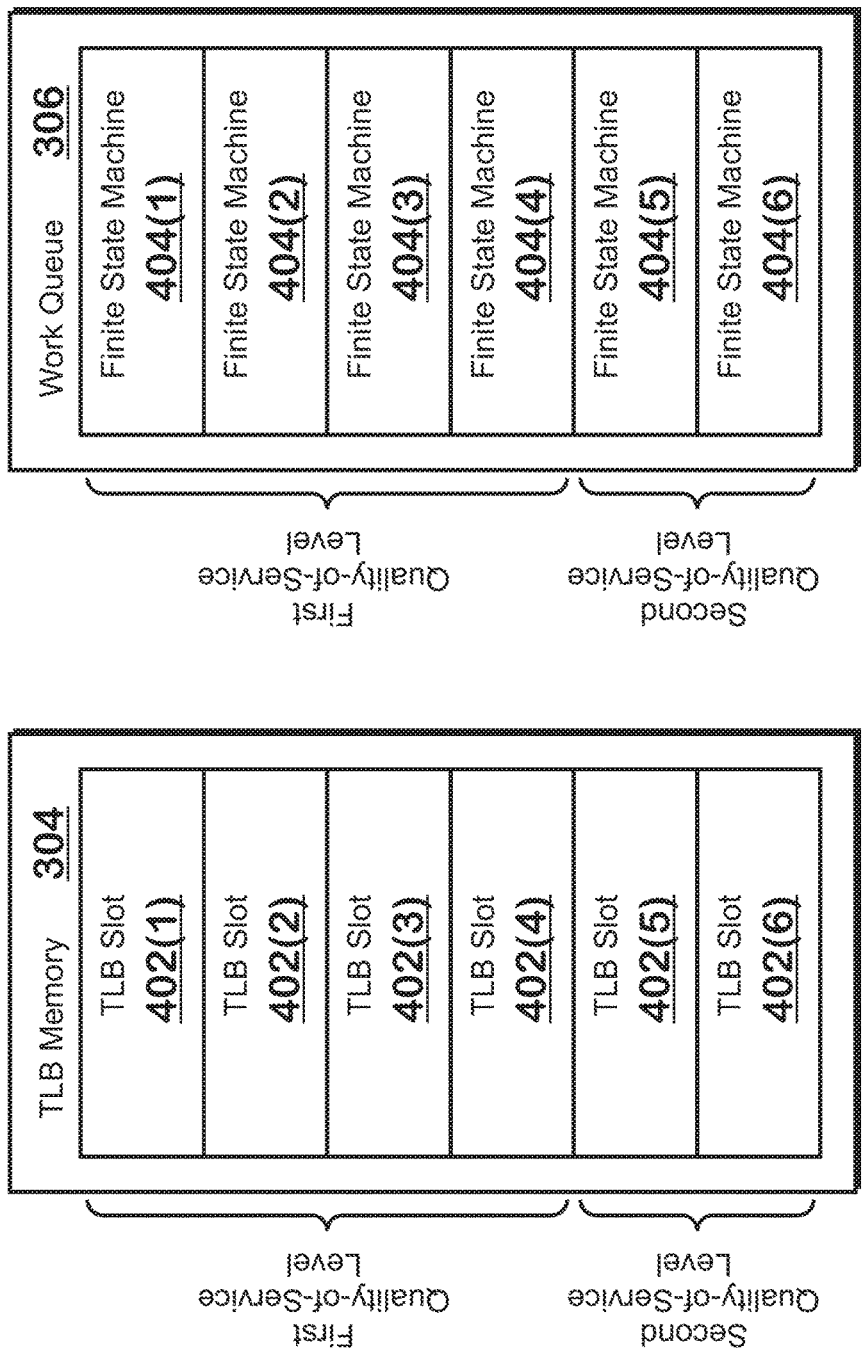
FIG. 4 illustrates the TLB memory of the TLB of FIG. 3 and the work queue of FIG. 3 in additional detail, according to an example.

FIG. 4 illustrates the TLB memory 304 of the TLB 300 of FIG. 3 and the work queue 306 of FIG. 3 in additional detail, according to an example. The TLB memory 304 includes multiple TLB slots 402, each of which is capable of storing a virtual-to-physical address translation.

As shown, the TLB slots 402 in the TLB memory 304 are reserved to either a first quality-of-service level or a second quality-of-service level. More specifically, the TLB slots 402(1)-402(4) are reserved to the first quality-of-service level and the TLB slots 402(5)-402(6) are reserved to the second quality-of-service level. This reservation means that TLB slots 402 reserved for a particular quality-of-service level are used to store translations for that particular quality-of-service level and are not used to store translations for other quality-of-service levels. For example, if a miss occurs in the TLB memory 304 for a particular virtual-to-physical address translation made for a request having a particular quality-of-service level, then after the TLB 300 fetches the virtual-to-physical address translation from a higher level TLB or the page tables 206, the TLB 300 selects a TLB slot 402 reserved to the particular quality-of-service level and not to any other quality-of-service level.

Similarly for the work queue 306, different finite state machines 404 are reserved for different quality-of-service levels. In the example of FIG. 4, finite state machines 404(1)-404(4) are reserved for a first quality-of-service level and finite state machines 404(5)-404(6) are reserved for a second quality-of-service level. The reservation means that an address translation associated with an address translation that specifies a particular quality-of-service level can be managed by a finite state machine 404 reserved for that quality-of-service level and cannot be managed by a finite state machine 404 reserved for a different quality-of-service level.

The FSMs 404 keep track of the state of translation requests. In one example, possible states include a state indicating that the FSM 404 is empty and can thus store data for a new translation request, a state indicating that the translation request is being processed in the TLB memory 304, a state indicating that the translation request is pending lookup in a higher-level cache in the TLB hierarchy 210 or in the page tables 206, and a state indicating that the translation request has been fulfilled and that the translated address can be used to access memory. In this example, an FSM 404 is in a state indicating that the FSM 404 is empty when a translation request is selected by the arbiter 302. The arbiter 302 selects the empty FSM 404 to store the translation request and the state of the FSM 404 thus changes to the state indicating that the translation request is being processed in the TLB memory 304. If a hit occurs in the TLB memory 304, then the state of the FSM 404 changes to the state indicating that the translation request has been fulfilled. If a miss occurs in the TLB memory 304, then the TLB memory 304 communicates with a higher level TLB or triggers a walk of the page tables 206 and the FSM 404 changes to the state indicating that the translation is pending lookup in a higher-level cache in the TLB hierarchy 210 or in the page tables 206. Once the translation is retrieved from the higher level TLB or the page tables 206, the state of the FSM 404 changes to the state indicating that the translation request has been fulfilled and that the translated address can be used to access memory. Once the FSM 404 is in this state, the TLB 300 outputs the translated address to access memory and the FSM 404 reverts to the "empty" state. The translated address is used to perform the memory access originally requested by the client 202, such as a read, write, or other memory access.

Figure 5:
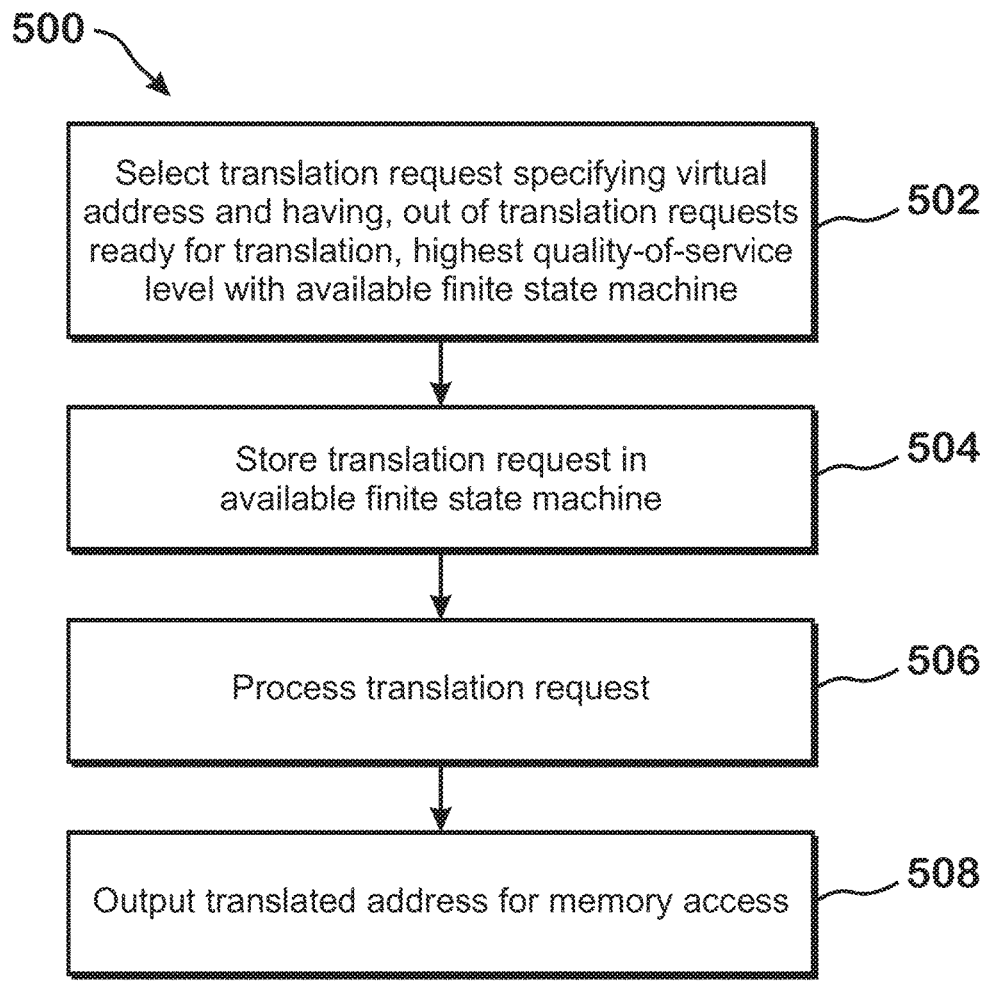
FIG. 5 is a flow diagram of a method for performing virtual-to-physical address translation for a memory access request, according to an example.

FIG. 5 is a flow diagram of a method 500 for performing virtual-to-physical address translation for a memory access request, according to an example. Although described with respect to the system shown and described with respect to FIGS. 1-4, it should be understood that any system configured to perform the method, in any technically feasible order, falls within the scope of the present disclosure.

The method 500 begins at step 502, where an arbiter 302 of a TLB 300 selects a translation request for processing. The translation request that is selected is the translation request that is available to the arbiter 302 that has the highest quality-of-service level. As described above, quality-of-service levels vary in terms of the latency and/or bandwidth requirements, with higher quality-of-service levels having lower latency and/or greater bandwidth requirements and lower quality-of-service levels having higher latency and/or lower bandwidth requirements (or none or minimal such requirements). However, if there is no free FSM 404 in the work queue 306 out of the FSMs 404 reserved for the quality-of-service level of the translation request, then the arbiter 302 instead selects an available request having a lower quality-of-service level. In selecting a request having a lower quality-of-service level, the arbiter 302 selects the request having the highest quality-of-service level for which an FSM 404 is available in the work queue 306.

At step 504, the arbiter 302 stores the translation request in the available FSM 404 for the quality-of-service level of the selected translation. As described above, the FSM 404 keeps track of the state of the translation request until a translation is retrieved and output for access to memories 204. Various possible states include a state indicating that that the FSM 404 is empty and can thus store data for a new translation request, a state indicating that the translation request is being processed in the TLB memory 304, a state indicating that the translation request is pending lookup in a higher-level cache in the TLB hierarchy 210 or in the page tables 206, and a state indicating that the translation request has been fulfilled and that the translated address can be used to access memory.

At step 506, the TLB 300 processes the translation request to obtain a physical memory address. Processing the translation request includes attempting to find the translation in the TLB memory 304 of the TLB 300 in which the FSM 404 resides. Processing the translation request also includes, if the TLB memory 304 does not include that translation, then transmitting a request to find the translation to a higher-level TLB or to page tables 206 for a page table walk. Once the translation is obtained, at step 508, the TLB 300 outputs the translated address to access the memories 204 via the translated address. When a lookup is being performed in a higher-level TLB, some such TLB also have resources reserved to particular quality-of-service levels and thus also performs the method 500 described in FIG. 5.

The amount of resources in a TLB 300 that are reserved for any particular quality-of-service level can be fixed, can be changed algorithmically or can be changed explicitly at the request of a unit in the device 100, such as the processor 102.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for accessing data stored in memory, the method comprising:
    selecting a translation request specifying a virtual memory address and having, out of a plurality of translation requests ready for translation, a highest quality-of-service level for which an available finite state machine ("FSM") exists in a translation lookaside buffer ("TLB") work queue;
    storing the selected translation request with the available FSM;
    processing the translation request to obtain a physical memory address; and
    outputting the physical memory address to access the data stored in the memory.

2. The method of claim 1, wherein selecting the translation request comprises:
    selecting, out of the plurality of translation requests, a translation request having a quality-of-service level lower than the highest quality-of-service level for requests of the plurality of translation requests, due to there being no available FSMs reserved for the highest quality-of-service level within the TLB work queue.

3. The method of claim 1, wherein selecting the translation request comprises:
    selecting, out of the plurality of translation requests, a translation request having a highest quality-of-service level out of the quality-of-service levels for the requests of the plurality of translation requests, due to there being an available FSM reserved for the highest quality-of-service level within the TLB work queue.

4. The method of claim 1, wherein processing the translation request in the available FSM comprises:
    finding the physical memory address corresponding to the virtual memory address in a TLB memory of the TLB.

5. The method of claim 1, wherein processing the translation request with the available FSM comprises:
    failing to find the physical memory address corresponding to the virtual memory address in a TLB memory of the TLB; and
    responsive to failing to find the physical memory address in the TLB, requesting a physical-to-virtual address translation from one of a higher-level TLB or from a page table.

6. The method of claim 5, wherein processing the translation request with the available FSM further comprises:
    receiving the physical-to-virtual address translation from the one of the higher-level TLB or the page table; and
    storing the physical-to-virtual address translation in a TLB slot reserved for the highest quality-of-service level for which the available FSM exists in the TLB work queue.

7. The method of claim 6, further comprising:
    receiving the translation request based on a memory access request from a client.

8. The method of claim 7, wherein the memory access request comprises one of a read access request or a write access request.

9. The method of claim 1, wherein the memory access requests specifies the quality-of-service level.

10. A translation lookaside buffer ("TLB"), comprising:
    an arbiter;
    a work queue; and
    a TLB memory,
    wherein the arbiter is configured to select a translation request specifying a virtual memory address and having, out of a plurality of translation requests ready for translation, a highest quality-of-service level for which an available finite state machine ("FSM") exists in the work queue, and
    wherein the work queue is configured to:
        store the selected translation request with the available FSM,
        process the translation request to obtain a physical memory address, and
        output the physical memory address to access the data stored in the memory.

11. The TLB of claim 10, wherein the arbiter is configured to select the translation request by:
    selecting, out of the plurality of translation requests, a translation request having a quality-of-service level lower than the highest quality-of-service level for requests of the plurality of translation requests, due to there being no available FSMs reserved for the highest quality-of-service level within the TLB work queue.

12. The TLB of claim 10, wherein the arbiter is configured to select the translation request by:
    selecting, out of the plurality of translation requests, a translation request having a highest quality-of-service level out of the quality-of-service levels for the requests of the plurality of translation requests, due to there being an available FSM reserved for the highest quality-of-service level within the TLB work queue.

13. The TLB of claim 10, wherein the work queue is configured to process the translation request in the available FSM by:
    finding the physical memory address corresponding to the virtual memory address in a TLB memory of the TLB.

14. The TLB of claim 10, wherein the work queue is configured to process the translation request in the available FSM by:
    failing to find the physical memory address corresponding to the virtual memory address in a TLB memory of the TLB; and
    responsive to failing to find the physical memory address in the TLB, requesting a physical-to-virtual address translation from one of a higher-level TLB or from a page table.

15. The TLB of claim 14, wherein the work queue is configured to process the translation request in the available FSM by:
    receiving the physical-to-virtual address translation from the one of the higher-level TLB or the page table; and
    storing the physical-to-virtual address translation in a TLB slot reserved for the highest quality-of-service level for which the available FSM exists in the TLB work queue.

16. The TLB of claim 15, wherein the arbiter is configured to:
  receive the translation request based on a memory access request from a client.

17. The TLB of claim 16, wherein the memory access request comprises one of a read access request or a write access request.

18. The TLB of claim 10, wherein the memory access requests specifies the quality-of-service level.

19. A computing system, comprising:
  a plurality of clients; and
  a translation lookaside buffer ("TLB"), comprising:
    an arbiter;
    a work queue; and
    a TLB memory,
    wherein the arbiter is configured to select a translation request generated based on a memory access from a client, of the plurality of clients, the translation request specifying a virtual memory address and having, out of a plurality of translation requests ready for translation, a highest quality-of-service level for which an available finite state machine ("FSM") exists in the work queue, and
    wherein the work queue is configured to:
      store the selected translation request with the available FSM,
      process the translation request to obtain a physical memory address, and
      output the physical memory address to access the data stored in the memory.

20. The computing system of claim 19, wherein:
  the memory access request comprises one of a read access request or a write access request; and
  the memory access requests specifies the quality-of-service level.

* * * * *